(12) United States Patent
Chen

(10) Patent No.: US 8,194,397 B2
(45) Date of Patent: Jun. 5, 2012

(54) COMPUTER CASE AND ADAPTER MODULE THEREOF

(75) Inventor: Ming-Ke Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 140 days.

(21) Appl. No.: 12/770,970

(22) Filed: Apr. 30, 2010

(65) Prior Publication Data

US 2011/0211304 A1    Sep. 1, 2011

(30) Foreign Application Priority Data

Feb. 26, 2010    (CN) .......................... 2010 1 0114924

(51) Int. Cl.
*G06F 1/16*    (2006.01)

(52) U.S. Cl. ................ 361/679.02; 312/223.2; 360/314; 248/680

(58) Field of Classification Search ............... 312/223.1, 312/223.2, 237, 219, 213, 7.2; 361/679.39, 361/679.21, 679.33, 679.31, 679.08, 679.02, 361/679.09, 679.34, 679.35; 360/97.02, 360/245.8, 314, 224, 265.1, 75, 99.12, 97.01, 360/98.04; 248/60, 631, 308.3, 544, 680
See application file for complete search history.

(56) References Cited

U.S. PATENT DOCUMENTS

| | | | |
|---|---|---|---|
| 6,257,682 B1 * | 7/2001 | Liu et al. | 312/223.2 |
| 6,272,007 B1 * | 8/2001 | Kitlas et al. | 361/679.32 |
| 8,023,258 B2 * | 9/2011 | Chen et al. | 361/679.33 |

* cited by examiner

*Primary Examiner* — Hung Duong
(74) *Attorney, Agent, or Firm* — Altis Law Group, Inc.

(57) ABSTRACT

A computer case includes a housing, a fixing bracket and an adapter module. The fixing bracket is fixed in the housing. The adapter module is detachably fixed in the fixing bracket. The adapter module includes a shell and a rear plate fixed to an end of the shell. The shell defines a receiving portion to receive a slim drive. The rear plate includes a first jack received in a port of the slim disc drive.

17 Claims, 5 Drawing Sheets

COMPUTER CASE AND ADAPTER MODULE THEREOF

BACKGROUND

1. Technical Field

The present disclosure relates to computer cases, and particularly, to a computer case supporting a slim disc drive.

2. Description of the Related Art

Slim and half-height disc drives are in frequent use. The slim disc drive is smaller than the half-height disc drive, and is often used in a notebook or server, while half-height disc drives are often deployed in desktops. However, a slim disc drive which may be available for use in a desktop computer, cannot be used, because no suitable mounting means is provided.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
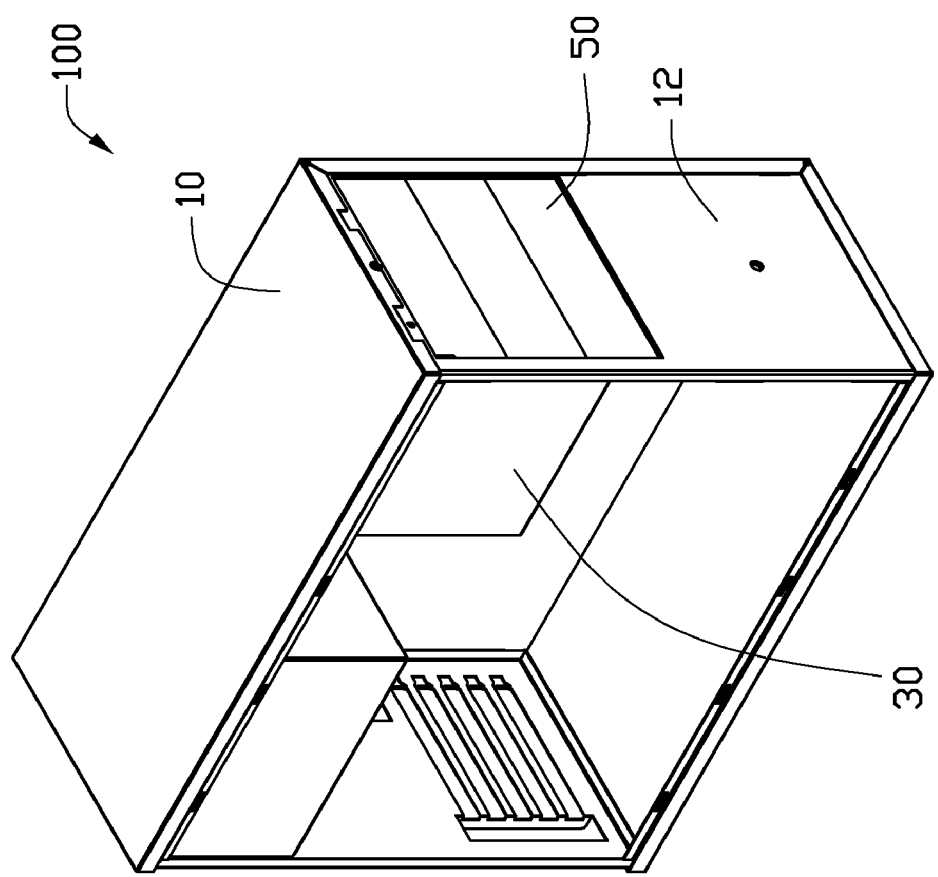
FIG. 1 is a partial isometric view of one embodiment of a computer case including an adapter module and a disc drive.
Figure 2:
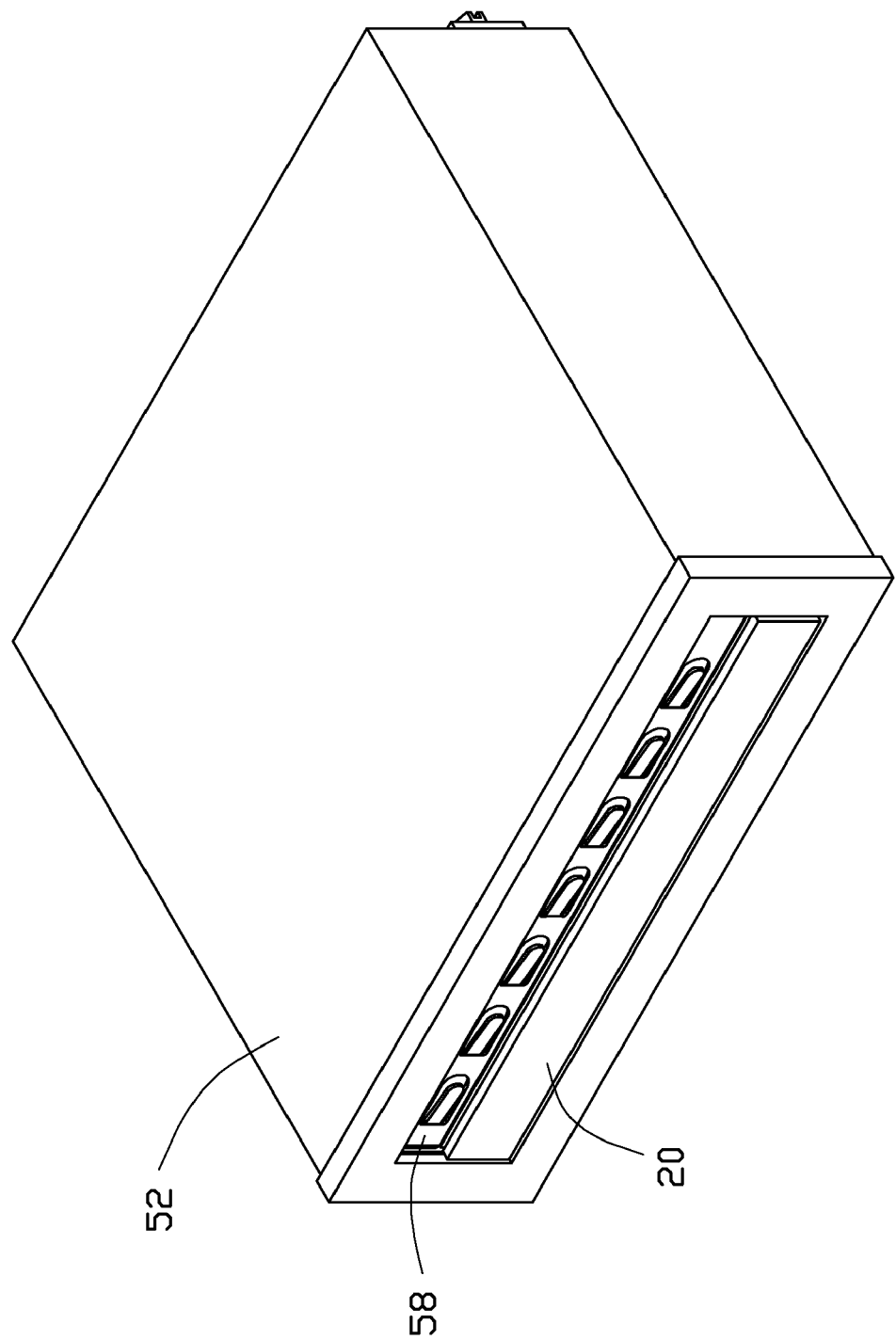
FIG. 2 is an assembled, isometric view of the adapter module fixed to the disc drive shown in FIG. 1.
Figure 3:
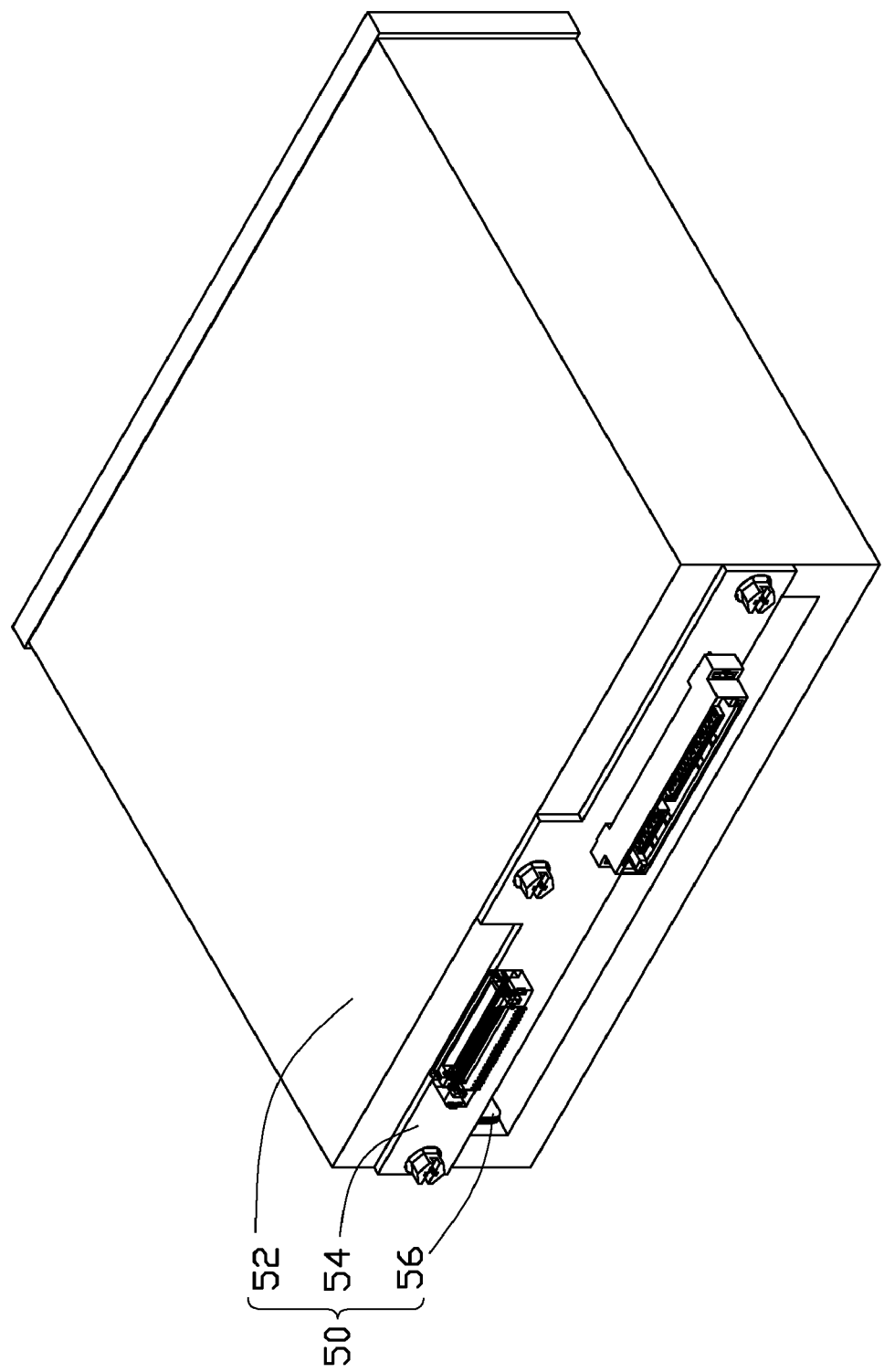
FIG. 3 is similar to FIG. 2, but viewed from another aspect.
Figure 4:
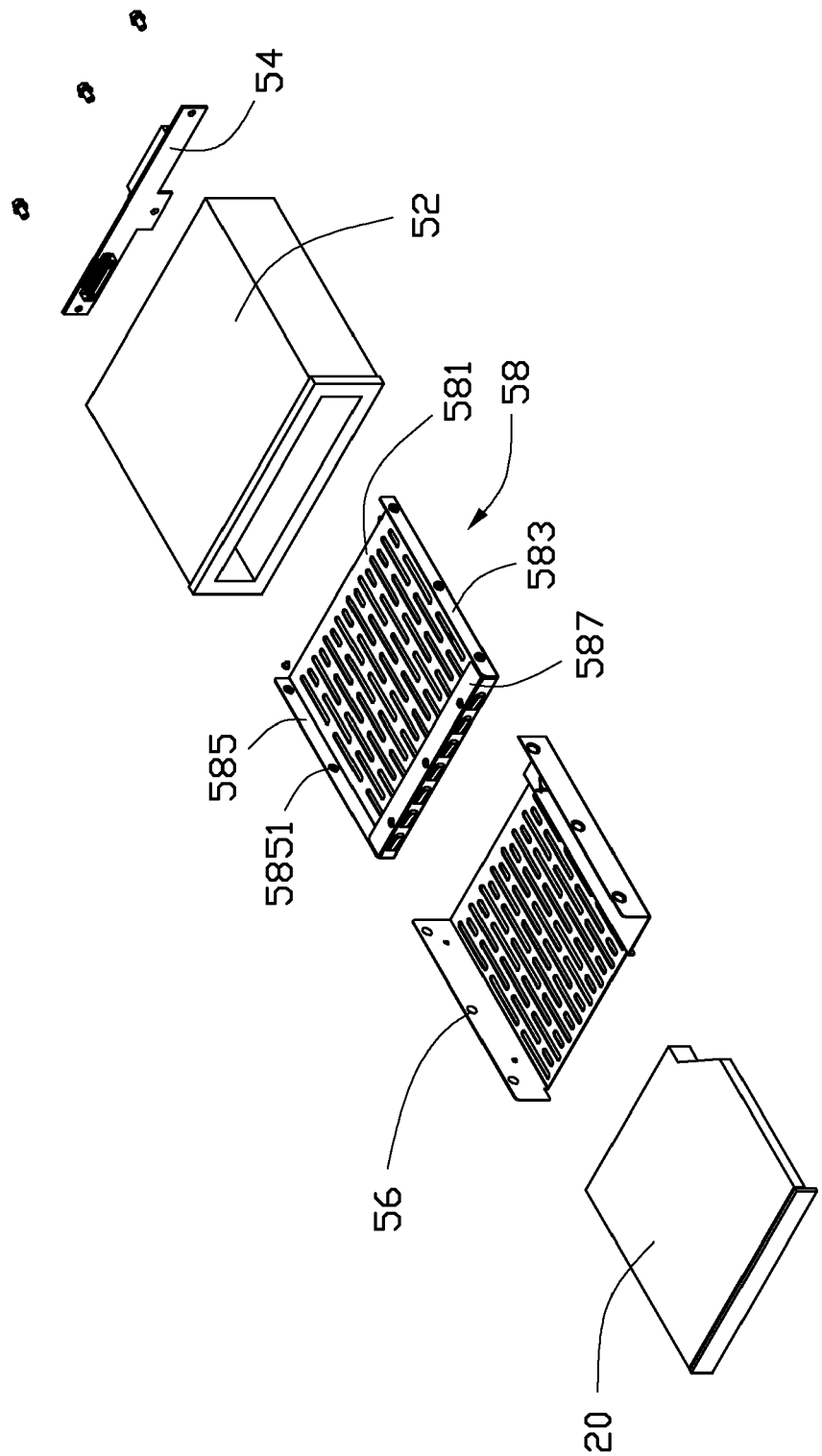
FIG. 4 is an exploded, isometric view of the adapter module shown in FIG. 2.

Referring to FIGS. 1 through 3, one embodiment of a computer case 100 includes a housing 10, a fixing bracket 30 and an adapter module 50. The housing 10 includes a facing plate 12. The fixing bracket 30 fixes the adapter module 50 adjacent to the facing plate 12. The adapter module 50 receiving a disc drive 20 is fixed to the fixing bracket 30. The disc drive 20 is a slim disc drive.

The fixing bracket 30 is a substantially rectangular case, sized to be compatible with a half-height disc drive.

Figure 5:
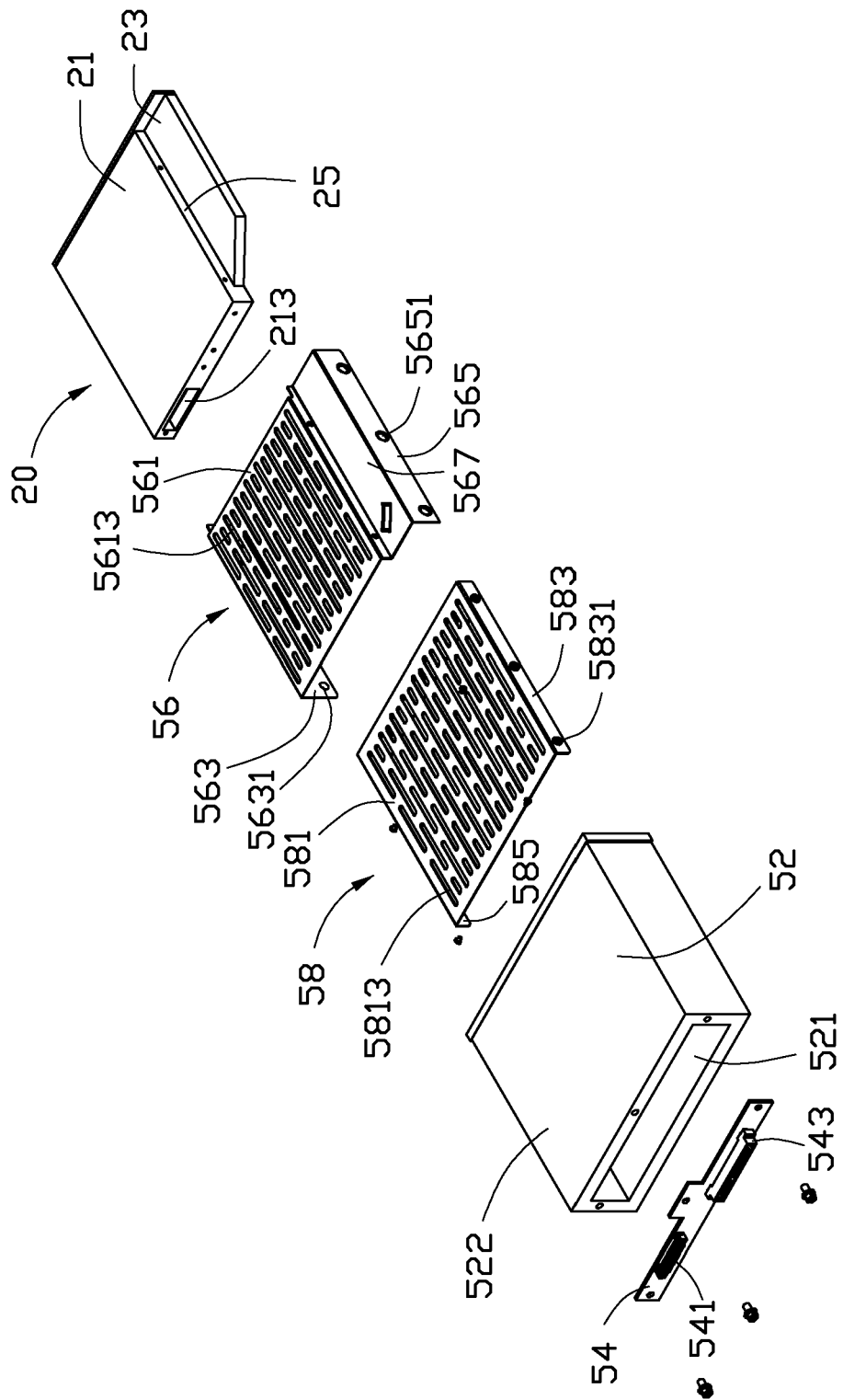
FIG. 5 is similar to FIG. 4, but viewed from another aspect.

Referring to FIG. 5, the disc drive 20 includes a main body 21 and an extending portion 23. The main body 21 defines a port 213 in an end of the main body 21. The extending portion 23 is disposed in a side of the main body 21. A thickness of the extending portion 23 is less than that of the main body 21. The extending portion 23 and the main body 21 cooperatively define a step plane 25.

The adapter module 50 includes a shell 52, a rear plate 54, a supporting member 56 and a covering member 58. The rear plate 54 is fixed to an end of the shell 52. The disc drive 20 is fixed between the supporting member 56 and the covering member 58. Both the supporting member 56 and the covering member 58 are received in the shell 52.

The shell 52 is substantially rectangular and includes four adjoining side plates 522. The four adjoining side plates 522 cooperatively define a receiving portion 521, which is the same size as the half-height disc drive.

The rear plate 54 includes a first jack 541 and a second jack 543 at opposite ends thereof. The first jack 541 is received in the port 213 of the disc drive 20, and is electrically connected to the second jack 543. The second jack 543 is received in a port of the half-height disc drive.

The supporting member 56 includes a supporting plate 561, a first fixing plate 563, a second fixing plate 565 and a resisting portion 567. The supporting plate 561 is substantially rectangular, and defines a plurality of through holes 5613 on the outer surface of the supporting plate 561. The first fixing plate 561 and the second fixing plate 565 extend substantially perpendicular to opposite ends of the supporting plate 561. The first fixing plate defines three threaded holes 5631. The second fixing plate 565 includes a receiving portion 5651 disposed on the outer surface of the second fixing plate 565. In the illustrated embodiment, the receiving portion 5651 is a latching hole defined in the second fixing plate 565. The resisting portion 567 is disposed in an end of the supporting plate 561 adjoining the first fixing plate 563.

The covering member 58 includes a covering plate 581, a first side plate 583, a second side plate 585 and a positioning plate 587. The covering plate 581 is substantially rectangular, and defines a plurality of through holes 5813. The first side plate 583 and the second side plate 585 extend substantially perpendicular to opposite sides of the covering plate 581. The first side plate 583 includes a latching portion 5831 disposed in an outer surface of the first side plate 583. The latching portion 5831 is received in the receiving portion 5651 of the second fixing plate 565. In the illustrated embodiment, the latching portion 5831 is at the outer surface of the second fixing plate 565. The second plate 585 defines three threaded holes 5631. The positioning plate 587 extends from a side of the covering plate 581 adjoining the first side plate 583 and the second side plate 585, and bends substantially parallel to the covering plate 581.

Referring to FIGS. 1 through 5, during mounting, the disc drive 20 is placed on the supporting member 56. The main body 21 of the disc drive 20 resists the supporting plate 561 of the supporting member 56. The extending portion 23 resists the resisting portion 567 of the supporting member 56. The covering member 58 is placed on the disc drive 20. The first side plate 583 and the second side plate 585 are fixed to the second fixing plate 565 and the first fixing plate 563 by a plurality of fasteners, respectively. The disc drive 20 is fixed to the supporting member 56 and the covering member 58 is received in the receiving portion 521 of the adapter module 50. The positioning plate 587 of the covering member 58 resists the shell 52 of the adapter module 50, such that the disc drive 20, the supporting member 56 and the covering member 58 are fixed in the receiving portion 521 of the shell 52. The rear plate 54 of the adapter module 50 is fixed in an end of the shell 52. The first jack 541 is received in the port 213 of the disc drive 20. The adapter module 50 is fixed in the fixing bracket 30.

During detachment, the adapter module 50 is withdrawn from the fixing bracket 30. The disc drive 20 fixed to the supporting member 53 and the covering member 58 is disassembled from the shell 52 of the adapter module 50. The first jack 541 of the adapter module 50 is detached from the port 213 of the disc drive 20. The second fixing plate 565 is elastically deformed, such that the latching portion 5831 of the first side plate 583 is detached from the receiving portion 5651 of the second fixing plate 565. The disc drive 20 is removed from the supporting member 56 and the covering member 58.

If the disc drive 20 is a slim disc drive, the disc drive 20 can be fixed in the fixing bracket 30 via the adapter module 50. If the disc drive 20 is a half-height disc drive, the disc drive 20 is fixed in the fixing bracket 30 without the adapter module 50. The computer case 100 is thus compatible with both slim and half-height disc drives.

It is to be understood that the supporting member 56 and the covering member 58 can further be omitted, with the disc drive 20 fixed in the receiving portion 521 of the shell 52 of the adapter module 50.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A computer case comprising:
   a housing;
   a fixing bracket fixed in the housing; and
   an adapter module detachably fixed in the fixing bracket, the adapter module defining a receiving portion to receive a slim disc drive;
   wherein, the adapter module comprises a shell, a rear plate fixed to an end of the shell, a supporting member and a covering member received in the receiving portion, the slim disc drive is fixed between the supporting member and the covering member.

2. The computer case of claim 1, wherein the shell comprises four adjoining side plates cooperatively defining the receiving portion.

3. The computer case of claim 2, wherein the shell is substantially the same size as a half-height disc drive.

4. The computer case of claim 1, wherein the rear plate comprises a first jack received in a port of the slim disc drive.

5. The computer case of claim 4, wherein the rear plate comprises a second jack electrically connected to the first jack, the second jack being received in a port of a half-height disc drive.

6. The computer case of claim 1, wherein the supporting member comprises a supporting plate, a first fixing plate and a second fixing plate, the first fixing plate and the second fixing plate extending substantially perpendicular to opposite ends of the supporting plate.

7. The computer case of claim 6, wherein the supporting member further comprises a resisting portion disposed in an end of the supporting plate adjoining the first fixing plate.

8. The computer case of claim 1, wherein the covering member comprises a covering plate and a first side plate and a second side plate, both extending substantially perpendicular to opposite sides of the covering plate.

9. The computer case of claim 1, wherein the covering member further comprises a positioning plate extending from a side of the covering plate adjoining the first side plate and the second side plate, and bending substantially parallel to the covering plate.

10. A adapter module comprising:
    a shell defining a receiving portion to receive a slim drive; and
    a rear plate fixed to an end of the shell, the rear plate comprising a first jack received in a port of the slim disc drive;
    wherein, the adapter module further comprises a supporting member and a covering member received in the receiving portion, the slim disc drive is fixed between the supporting member and the covering member.

11. The adapter module of claim 10, wherein the shell comprises four adjoining side plates cooperatively defining the receiving portion.

12. The adapter module of claim 11, wherein the shell is substantially the same size as a half-height disc drive.

13. The adapter module of claim 12, wherein the rear plate comprises a second jack electrically connected to the first jack, the second jack being received in a port of a half-height disc drive.

14. The adapter module of claim 10, wherein the supporting member comprises a supporting plate and a first fixing plate and a second fixing plate, both extending substantially perpendicular to opposite ends of the supporting plate.

15. The adapter module of claim 14, wherein the supporting member further comprises a resisting portion disposed in an end of the supporting plate adjoining the first fixing plate.

16. The adapter module of claim 10, wherein the covering member comprises a covering plate and a first side plate and a second side plate, both extending substantially perpendicular to opposite sides of the covering plate.

17. The adapter module of claim 10, wherein the covering member further comprises a positioning plate extending from a side of the covering plate adjoining the first side plate and the second side plate, and bending substantially parallel to the covering plate.

* * * * *